US010119572B2

(12) United States Patent
Massini et al.

(10) Patent No.: US 10,119,572 B2
(45) Date of Patent: Nov. 6, 2018

(54) ELECTRO-MAGNETIC BEARING ASSEMBLY WITH INNER VENTILATION TO COOL THE BEARING

(71) Applicant: Nuovo Pignone Srl, Florence (IT)

(72) Inventors: Andrea Massini, Florence (IT); Luciano Mei, Florence (IT); Manuele Bigi, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 382 days.

(21) Appl. No.: 14/893,805

(22) PCT Filed: May 23, 2014

(86) PCT No.: PCT/EP2014/060640
§ 371 (c)(1),
(2) Date: Nov. 24, 2015

(87) PCT Pub. No.: WO2014/191311
PCT Pub. Date: Dec. 4, 2014

(65) Prior Publication Data
US 2016/0102712 A1    Apr. 14, 2016

(30) Foreign Application Priority Data
May 27, 2013  (EP) ..................... 13169387

(51) Int. Cl.
*H02K 7/09*         (2006.01)
*F16C 37/00*        (2006.01)
(Continued)

(52) U.S. Cl.
CPC ........ *F16C 37/005* (2013.01); *F16C 32/0468* (2013.01); *F16C 32/0474* (2013.01);
(Continued)

(58) Field of Classification Search
CPC ........................................... H02K 5/15
(Continued)

(56) References Cited

U.S. PATENT DOCUMENTS

| 4,935,654 A | 6/1990 | Glass et al. |
| 6,057,619 A | 5/2000 | Domberg et al. |
| 2009/0046960 A1* | 2/2009 | Hibi ...................... F16C 17/02 384/107 |

FOREIGN PATENT DOCUMENTS

| EP | 0317946 A2 | 5/1989 |
| EP | 1522749 A1 | 4/2005 |

(Continued)

OTHER PUBLICATIONS

European Search Report and Written Opinion issued in connection with corresponding EP Application No. 13169387.1-1758 dated Jan. 7, 2014.

(Continued)

*Primary Examiner* — Jianchun Qin
(74) *Attorney, Agent, or Firm* — GE Global Patent Operation

(57) ABSTRACT

A magnetic bearing assembly for a rotary machine, having a rotor circuit and a stator magnetic circuit secured to a stationary support element having at least one body of ferromagnetic material and at least one coil, both being fitted in a protective annular housing leaving uncovered a surface of revolution of said ferromagnetic body and a surface of revolution of said one coil facing a surface of revolution of the rotor circuit. The bearing assembly comprises at least one row of blades secured on the rotor circuit.

8 Claims, 2 Drawing Sheets

(51) Int. Cl.
*F16C 32/04* (2006.01)
*H02K 1/12* (2006.01)

(52) U.S. Cl.
CPC ............... *H02K 1/12* (2013.01); *H02K 7/09* (2013.01); *F16C 32/048* (2013.01); *F16C 32/0476* (2013.01); *F16C 2360/00* (2013.01)

(58) Field of Classification Search
USPC ....................................................... 310/90.5
See application file for complete search history.

(56) References Cited

FOREIGN PATENT DOCUMENTS

| | | | |
|---|---|---|---|
| EP | 1717468 | A1 | 11/2006 |
| JP | 0296018 | U | 7/1990 |
| JP | 02109014 | U | 8/1990 |
| JP | 0571533 | A | 3/1993 |
| SU | 1275145 | A1 | 12/1986 |

OTHER PUBLICATIONS

International Search Report and Written Opinion issued in connection with corresponding PCT Application No. PCT/EP2014/060640 dated Jul. 1, 2014.

\* cited by examiner

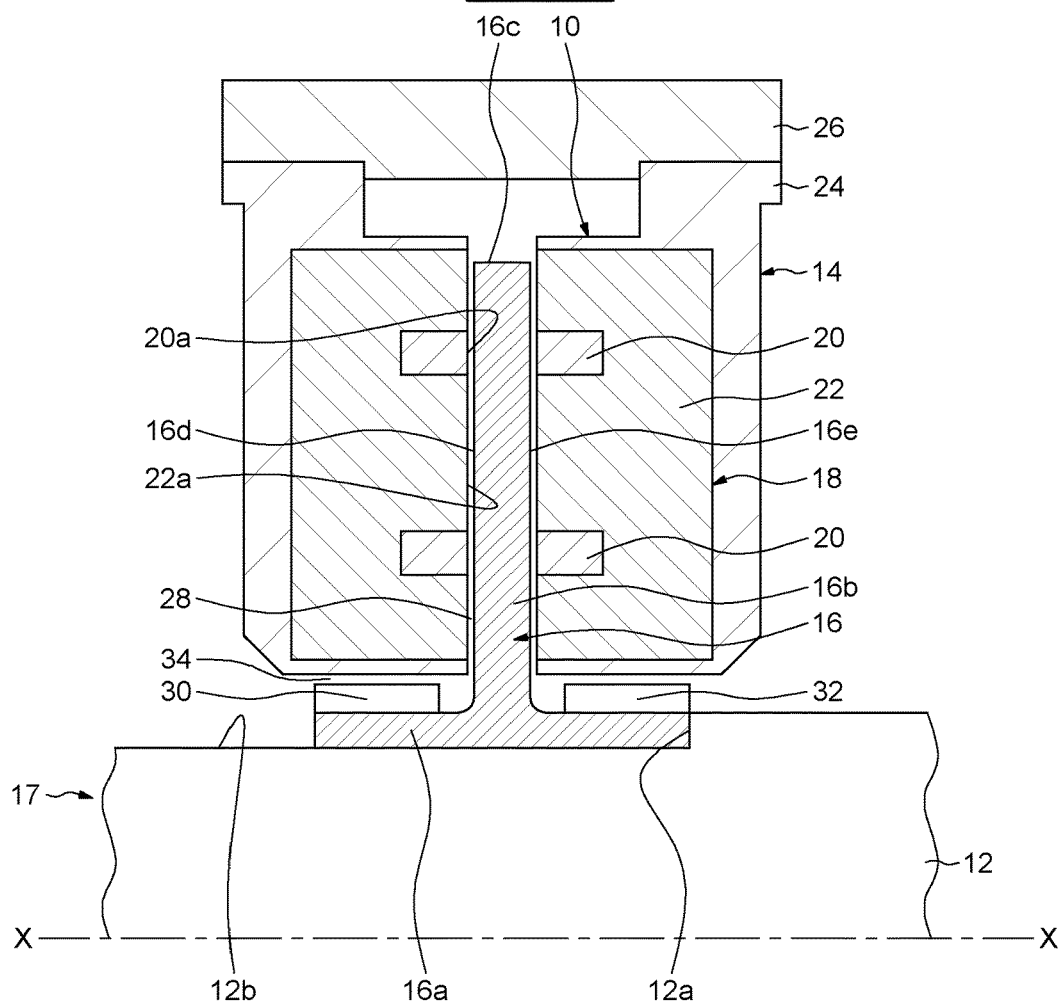
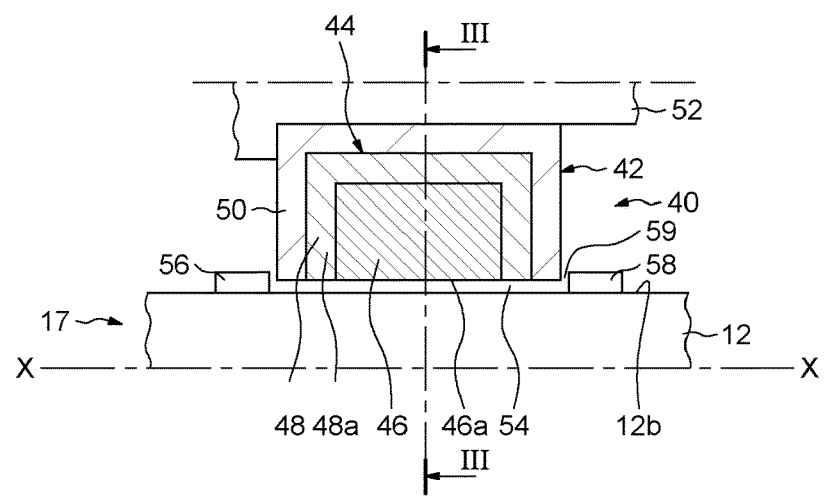

ELECTRO-MAGNETIC BEARING ASSEMBLY WITH INNER VENTILATION TO COOL THE BEARING

CROSS-REFERENCE TO RELATED APPLICATIONS

This application is a national stage application under 35 U.S.C. § 371(c) of prior filed, co-pending PCT application Ser. No. PCT/EP2014/060640, filed on May 23, 2014, which claims priority to EP Patent Application Ser. No. 13169387.1, titled "MAGNETIC BEARING ASSEMBLY HAVING INNER VENTILATION" filed May 27, 2013. The above-listed applications are herein incorporated by reference.

BACKGROUND

Embodiments of the invention relate to bearings, in particular magnetic bearings used in rotary machines having a rotor.

In particular, the embodiments of the invention relate to active magnetic bearings having electromagnetic elements arranged in the radial direction and adapted to cooperate with a rotor circuit secured to the rotor.

Axial magnetic bearings use electromagnetic forces pulling in opposition on the thrust collar secured to the rotor shaft to maintain relative position of a rotating assembly (rotor) to a stationary component (stator). A thrust collar is generally a flat, solid, ferromagnetic disc secured to the rotor. Disc-shaped electromagnetic elements are located on either side of the thrust collar and bolted to the rotary machine housing, forming the active axial magnetic bearing.

Use of magnetic bearings in rotary machines is becoming more and more widespread, in particular in case of corrosive or hot fluid. The inner ventilation of the magnetic bearing is thus important to increase the service-life of the bearing.

The friction generated by the relative movement of the thrust collar with respect to the electromagnetic elements creates a radial flow of fluid which leads to the cooling of the magnetic bearing.

However, such flow is dependent of the friction between two components and the rotational speed of the rotor, and is thus not reliable. Furthermore, because of uncertainty in the pressure distribution, a back flow could appear which would lead to a lack of flow of cooling fluid.

Current magnetic bearings do not provide enough inner ventilation, so that the flow of fluid becomes insufficient to cool the axial magnetic bearing.

SUMMARY OF THE INVENTION

An object of embodiments of the invention is to remedy the above drawbacks.

It is a particular object of embodiments of the invention to provide a magnetic bearing assembly having enhanced cooling flow, while being easy to manufacture.

It is another object of embodiments of the invention to ensure recirculation of the flow of cooling fluid even in case of poor differential pressure inside the bearing.

In one embodiment, a magnetic bearing assembly for a rotary machine, comprises a rotor circuit and a stator magnetic circuit secured to a stationary support element and comprising at least one body of ferromagnetic material and at least one coil, both being fitted in a protective annular housing leaving uncovered a surface of revolution of the ferromagnetic body and a surface of revolution of the one coil facing a surface of revolution of the rotor circuit.

The bearing assembly comprises at least one row of blades secured on the rotor circuit. Such row of blades facilitates the pumping of the flow of cooling fluid enhancing the cooling of the magnetic bearing. In an embodiment, the one row of blades comprises a plurality of blades extending from the rotor circuit.

In an embodiment, the rotor circuit comprises an annular thrust collar having an axial portion secured to a rotor shaft and radially extending towards the stator magnetic circuit by a radial portion, the radial portion facing the uncovered surfaces of the ferromagnetic body and the one coil. The row of blades is, for example, secured to the annular thrust collar and extends radially from the annular thrust collar towards the stator magnetic circuit.

In an embodiment, the bearing is an axial magnetic bearing.

In another embodiment the bearing is a radial magnetic bearing.

The one row of blades may comprise a plurality of axial blades or a plurality of radial blades or a combination of the radial and axial type of blades.

In an embodiment, the bearing assembly comprises two rows of blades.

The radial magnetic bearing can be axially located between the two rows of blades.

In an embodiment, the stator magnetic circuit comprises two bodies of ferromagnetic material, each facing the radial lateral surface of the radial portion of the annular thrust collar, each row of blades being secured on the axial portion of the collar and radially located between the annular thrust collar and each stator magnetic circuits.

According to another aspect of the invention, a turbo machine comprises a stator, a rotor mounted in rotation in the stator, and at least one magnetic bearing assembly as described above radially arranged between the rotor and the stator.

BRIEF DESCRIPTION OF THE DRAWINGS

Embodiments of the invention will be better understood from studying the detailed description of a number of embodiments considered by way of entirely non-limiting examples and illustrated by the attached drawings in which:

FIG. 1 is an axial half-section of the magnetic bearing assembly according to a first embodiment of the invention;

FIG. 2 is an axial half-section of the magnetic bearing assembly according to a second embodiment of the invention.

DETAILED DESCRIPTION OF THE INVENTION

Figure 3:
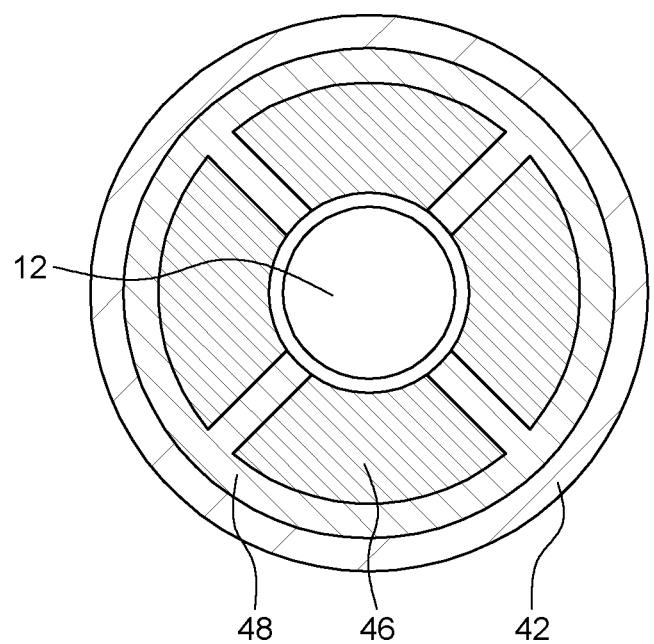
FIG. 3 is a cross-section according to the line III-III of FIG. 2.

The following detailed description of the exemplary embodiments refers to the accompanying drawings. The same reference numbers in different drawings identify the same or similar elements. Additionally, the drawings are not necessarily drawn to scale.

As illustrated on FIG. 1, a magnetic bearing assembly, designed by general reference number 10, is designed to be mounted in a rotary machine (not shown) comprising a casing or housing, a rotating shaft 12 extending along an axis X-X and adapted to support a rotor part (not shown).

For example, if the rotating machine is a centrifugal compressor, the rotor part comprises impellers.

As illustrated on FIG. 1, the magnetic bearing 10 is of the axial type and is designed to support the rotor shaft 12 inside the stator casing.

The active magnetic bearing 10 comprises a stator armature 14 fixed to the stator casing and a rotor armature 16 or annular thrust collar having the shape of a disk secured to the rotating shaft 12.

The annular thrust collar 16 and the rotor shaft 12 form the rotor circuit 17. The annular thrust collar 16 extend s radially from an axial plate 16a secured to the rotor shaft 12 towards the stator magnetic circuit 18 by a radial portion 16b having an outer cylindrical surface 16c and two lateral surfaces 16d, 16e.

The stator armature 14 comprises a stator magnetic circuit 18 including, in conventional manner, one or more annular coils 20 and two ferromagnetic bodies 22 which may be massive or laminated locally. In the example of FIG. 1, each ferromagnetic body 22 encloses two annular coils 20. The stator armature 14 also comprises a protective annular support or annular housing 24 into which is placed the stator magnetic circuit 18, leaving uncovered a surface of revolution 22a of the ferromagnetic bodies 22 and a surface 20a of revolution of each coils 20. The support 24 is secured to a stationary support element 26 that is itself fixed to the casing. As illustrated, the surfaces of revolution 20a, 22a are the axial lateral surface.

As illustrated, the radial portion 16b of the thrust collar 16 faces the uncovered surfaces 20a, 22a respectively of each ferromagnetic bodies 22 and each coils 20. In other words, the stator magnetic circuit 18 is placed axially facing one of the radial lateral surface 16d, 16e of the radial portion 16b of the annular thrust collar 16 with no mechanical contact, leaving an axial gap 28 between the annular thrust collar 16 and the stator magnetic circuit 18.

The rotation shaft 12 may be provided with a stepped profile 12a for an axial positioning of the thrust collar 16. Alternatively, the annular thrust collar 16 could, for example, be made integrally with the rotor shaft 12.

As illustrated on FIG. 1, the bearing assembly 10 comprises two rows of blades 30, 32 comprising a plurality of blades (not shown) which can be axial or radial or a combination thereof, secured on the axial plate 16a of the thrust collar 16. The blade s 30, 32 extend radially from the annular thrust collar 16 towards the stator magnetic circuit 18. Alternatively, the rows of blades 30, 32 can be secured directly to the rotor shaft 12. As illustrated, each row of blades 30, 32 can be radially located between the annular thrust collar 16 and each annular housing 24 of the stator magnetic circuits 18, leaving a radial air gap 34 between the annular housing 24 and one of the rows of blades 30, 32.

Such row s of blades 30, 32 increase the ventilation inside the magnetic bearing and allow the magnetic bearing to be cooled.

The embodiment shown in FIGS. 2 and 3, in which identical parts bear the same reference, differs from the embodiment of FIG. 1 in the type of magnetic bearing.

As illustrated on FIGS. 2 and 3, the magnetic bearing 40 is of the radial type and is designed to support radially the rotor shaft 12 inside the stator casing.

The radial magnetic bearing 40 comprises a stator armature 42 fixed to the stator casing and the rotating shaft 12 forming the rotor circuit 17. Alternatively, an additional rotor armature may be secured to rotor shaft 12 facing the stator armature 42.

The stator armature 42 comprises a stator magnetic circuit 44 including, in conventional manner, one or more coils 46 and one annular ferromagnetic body 48 which may be massive or laminated locally. As shown in FIG. 3, the ferromagnetic body 48 encloses four circumferentially equally spaced coils 46. The stator armature 42 also comprises a protective annular support or annular housing 50 into which is placed the stator magnetic circuit 44, leaving uncovered a surface of revolution 48 of the ferromagnetic body 48 and a surface 46a of revolution of each coils 46. The protective annular support 50 is secured to a stationary support element 52 that is itself fixed to the casing.

As illustrated, the outer cylindrical surface 12b of the rotor shaft 12 faces the uncovered surfaces 46a, 48a respectively of ferromagnetic body 48 and each coils 46, In other words, the stator magnetic circuit 44 is placed radially facing the outer cylindrical surface 12b of the rotor shaft 12, leaving a radial gap 54 between the rotor shaft 12 and the stator magnetic circuit 44.

As illustrated on FIG. 2, the bearing assembly 40 comprises two rows of blades 56, 58 comprising a plurality of blades (not shown) which can be axial or radial or a combination thereof, secured on the outer cylindrical surface 12b of the rotor shaft 12. The blades 56, 58 extend axially from the rotor shaft 12 towards the stator magnetic circuit 44. As illustrated, the stator magnetic circuit 44 is located axially between the two rows of blades 56, 58, leaving an axial air gap 59 between the annular housing 50 and each of the rows of blades 56, 58.

As an example, a magnetic bearing assembly may comprise the combination of a radial type magnetic bearing 40 as shown on FIG. 2 associated to the axial type magnetic bearing 10 as shown on FIG. 1 to support the rotating shaft 12.

The each magnetic bearing assembly has enhanced cooling flow.

Indeed, the rows of blades facilitate the pumping of the flow of fluid enhancing the cooling of the active magnetic bearing. The magnetic bearing is thus provided with inner ventilation.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A magnetic bearing assembly for a rotary machine comprising:
   a rotor circuit;
   a stator magnetic circuit secured to a stationary support element, and comprising two bodies of ferromagnetic material and at least one coil fitted in a protective annular housing leaving uncovered a surface of revolution of the two bodies of ferromagnetic material and a surface of revolution of the at least one coil facing a surface of revolution of the rotor circuit; and
   at least one row of blades secured on the rotor circuit,
   the rotor circuit comprises an annular thrust collar having an axial portion secured to a rotor shaft and radially extending towards the stator magnetic circuit by a radial portion, the radial portion facing the uncovered surfaces of the two bodies of ferromagnetic material and the at least one coil, each of the two bodies of ferromagnetic material face a radial lateral surface of the radial portion of the annular thrust collar, and each of the at least one row of blades is secured on the axial portion of the thrust collar and radially located between the annular thrust collar and the stator magnetic circuit.

2. The magnetic bearing assembly according to claim 1, wherein the at least one row of blades comprises a plurality of blades extending from the rotor circuit.

3. The magnetic bearing assembly according to claim 1, wherein the bearing is an axial magnetic bearing.

4. The magnetic bearing assembly according to claim 1, wherein the at least one row of blades comprises a plurality of axial blades.

5. The magnetic bearing assembly according to claim 1, wherein the at least one row of blades comprises a plurality of radial blades.

6. The magnetic bearing assembly according to claim 1, wherein the at least one row of blades comprises a plurality of blades which shape is a combination of the radial and axial type.

7. The magnetic bearing assembly according to claim 1, comprising two rows of blades.

8. A turbo machine comprising a stator, a rotor mounted in rotation in the stator, and at least one magnetic bearing assembly according to claim 1 radially arranged between the rotor and the stator.

* * * * *